Aug. 27, 1940.   J. G. HAWLEY   2,212,523
BRAKE
Filed Feb. 13, 1935   3 Sheets-Sheet 3
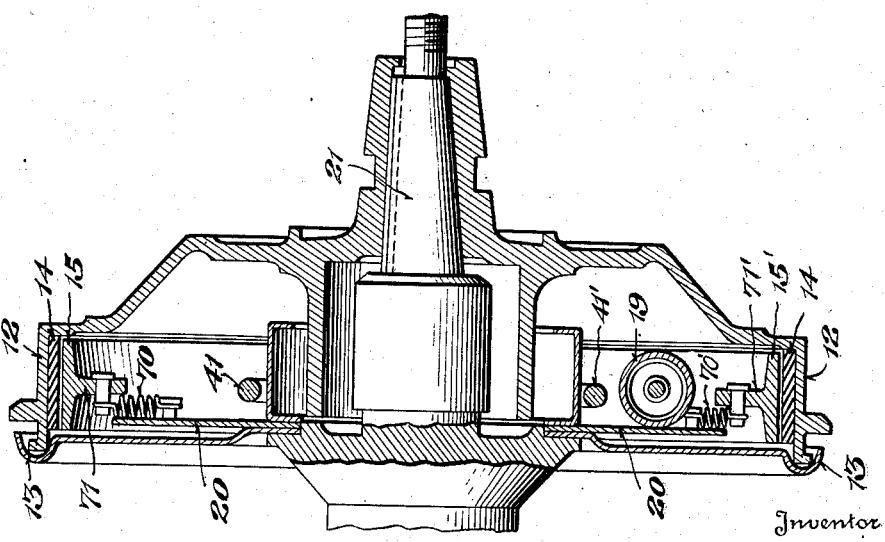
Inventor
Jesse G. Hawley,
By Albert T. St Clair
Attorney Patented Aug. 27, 1940

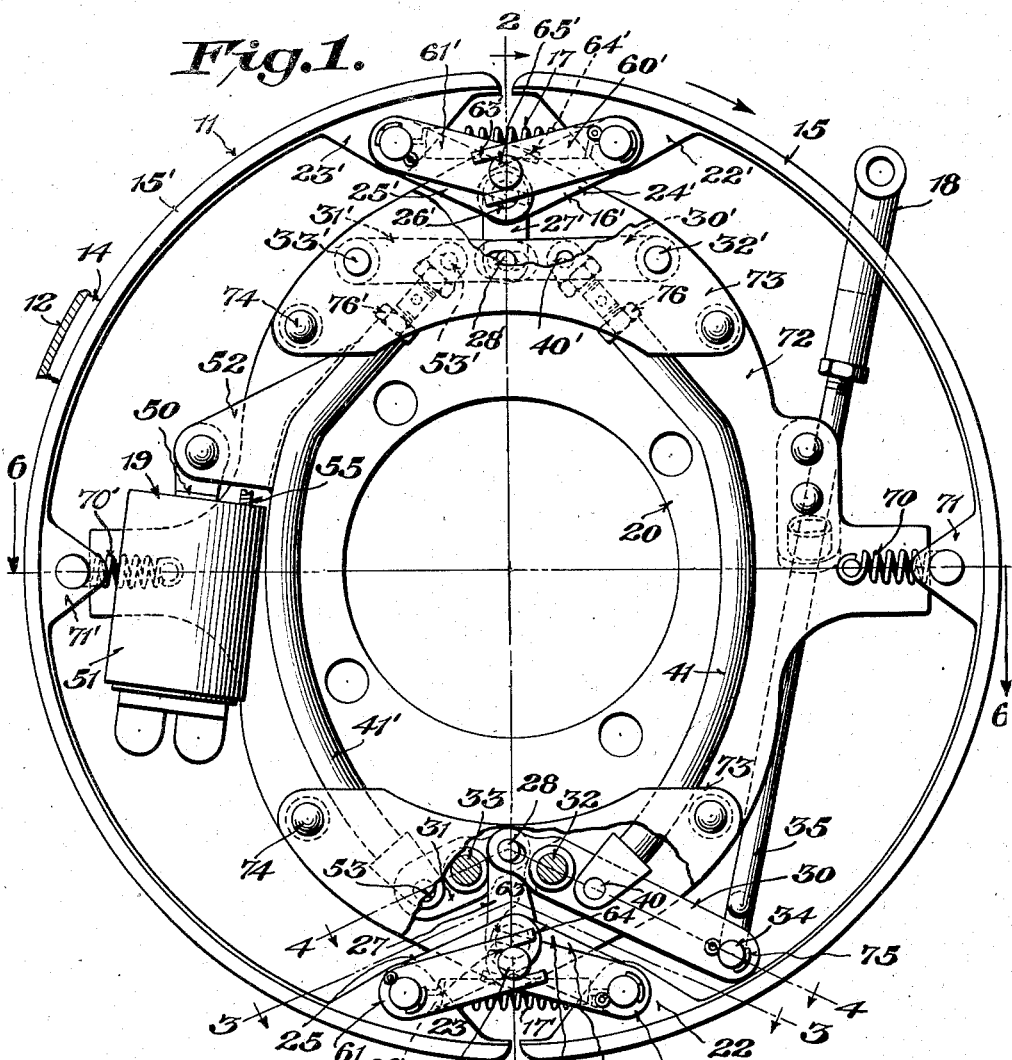
Aug. 27, 1940.  J. G. HAWLEY  2,212,523
BRAKE
Filed Feb. 13, 1935  3 Sheets-Sheet 1
Inventor
Jesse G. Hawley,
By Albert T. St Clair
Attorney

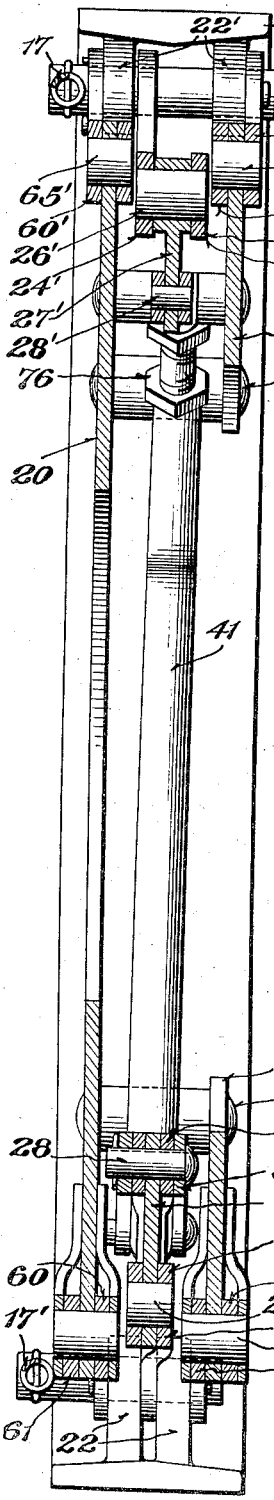
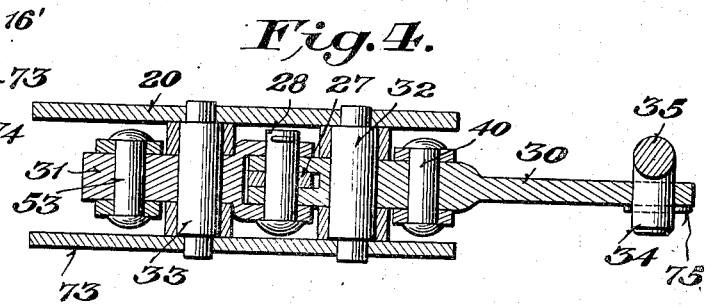
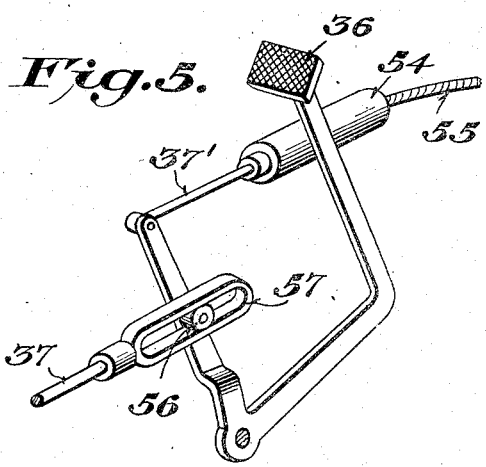

2,212,523

UNITED STATES PATENT OFFICE 2,212,523

BRAKE

Jesse G. Hawley, Painted Post, N. Y., assignor to Hawley-Jones Corporation, Riverside, N. Y., a corporation of New York Application February 13, 1935, Serial No. 6,361

6 Claims. (Cl. 188—78)

This invention relates to the art of brakes and more particularly to internally expanding brakes.

Prior brakes have generally been of relatively complicated mechanism, including a fixed brake lining, and a relatively fixed brake shoe, which resulted in overheating, improper centering of the brake shoes, irregular wear on the brake lining, slow release and difficult replacement of the brake lining.

My present invention is adapted for either automobile or airplane use, and overcomes the above defects by providing a brake with a creeping brake lining, and a pair of self-centering brake shoes that are each anchored at both ends for controlled movement in response to either mechanically applied or hydraulically applied actuating pressure, or by both.

It is therefore an object of this invention to provide a new and improved brake.

It is another object to provide a brake with a pair of self-centering brake shoes and a creeping brake lining.

It is a further object to provide a brake comprising a pair of brake shoes, each anchored at both ends for controlled movement.

It is a still further object to provide a brake operative in both directions with two anchors controlling movement in each direction.

It is an additional object to provide a brake in which power is applied to two separate brake shoes at the same time to provide an equally balanced brake.

It is another object to provide a brake actuated by either mechanical or hydraulic means, or by both.

With the above and other objects in view, which will be apparent as the description proceeds, I have set forth my invention in the following specification, and have illustrated it in the accompanying drawings in which:

Figure 1 is a side elevation of one form of brake shoe and its related parts embodying my invention;

Fig. 2 is a vertical transverse section, on the line 2—2 of Fig. 1, showing the brake shoe and related parts.

Fig. 3 is a transverse section on the line 3—3 of Fig. 1 showing one toggle mechanism;

Fig. 4 is a transverse section on the line 4—4 of Fig. 1 showing the brake applying linkage;

Fig. 5 is a diagrammatic view showing one type of brake applying means;

Fig. 6 is a vertical transverse section on the line 6—6 of Fig. 1, showing the brake shoe and related parts arranged in position in the brake drum for a rear wheel of a vehicle; and Fig. 7 is a side elevation of another embodiment of my invention.

Referring to the accompanying drawings, and particularly to Figs. 1 and 6 thereof, my brake 11 preferably comprises a drum 12, a fixed brake cover 13, a creeping brake lining 14, a pair of self-centering brake shoes 15, 15', toggles 16, 16' for expanding the brake shoes into contact with the brake lining when the brake is to be applied, springs 17, 17' for assisting in withdrawing them, a mechanical operating means 18, and a hydraulic operating means 19.

In the embodiments of my invention shown herein, which are adapted for use on either automobile or airplane wheels, the drum 12 may be of any desired construction, although it is here shown as a ring-shaped member that is made integral with the hub of a wheel (not shown), this being the drum of one of the rear wheels in Fig. 6.

My brake shoes 15, 15' are mounted so as to have a self-centering action by yieldingly connecting them with a spider 20, as described below, and the spider 20 and brake cover 13 are preferably bolted to the hub flange of an axle 21.

The drum 12 and its wheel are free to turn with respect to the fixed brake cover 13, spider 20, and the self-centering brake shoes 15, 15'.

The toggle 16, which is shown at the bottom of Figs. 1 and 2, preferably comprises toggle links 24 and 25 whose outer ends are pivotally connected to bosses 22, 23, respectively, formed integral with one end of brake shoes 15, 15', respectively. The inner ends of links 24 and 25 are mounted on a toggle pin 26.

The latter is provided with a link 27 by which it is connected to a pin 28 that carries a pair of levers 30 and 31 pivoted to the spider 20 at 32 and 33, respectively.

Lever 30 is pinned at 34 to the brake pull rod 35 of the mechanical operating means 18 (Fig. 1). Pull rod 35 is connected with the brake pedal 36 by any suitable mechanism, such as a connecting rod 37 (Fig. 5).

At a point 40 on lever 30, intermediate the pivot 32 and the pin 34, there is pinned one end of a connecting rod 41 whose opposite end is pinned at 40' to a lever 30' at the opposite side of the brake. Lever 30' corresponds to lever 30 and its outer end is pivoted at 32' to the spider 20, while its inner end is connected to a link 27' by a pin 28'. Link 27' transmits motion to the toggle 16', to which it is secured by a pin 26'. Toggle 16' comprises toggle links 24', 25', which are pivotally connected to bosses 22', 23', respectively, formed integral with the opposite end of brake shoes 15; 15', respectively.

The hydraulic operating means 19 is of any suitable type and comprises a fluid operated piston 50 which is actuated in a cylinder 51 as explained hereinafter. The outer end of piston 50 is attached to a projecting lug 52 on a connecting rod 41', corresponding to rod 41. Rod 41' is connected to lever 31 by a pin 53, and lever 31 is pivoted to the spider at 33. At its opposite end, rod 41' is pinned at 53' to lever 31', which is pivoted at 33' to the spider 20.

The hydraulic operating means 19 is actuated in any desired way, as by means of the brake pedal 36, through connecting rod 37', an auxiliary fluid cylinder 54 and flexible tubing 55. As indicated in Fig. 5, with the construction shown in Fig. 1 the initial depression of the brake pedal 36 by the operator actuates the hydraulic operating means 19, by actuating auxiliary fluid cylinder 54, and this in turn, through tubing 55, will move piston 50 in cylinder 51 and apply the brake as explained below. If for any reason this does not function, or does not operate rapidly enough, the further depression of the brake pedal causes the pin 56, in slotted link 57, to move connecting rod 37 and actuate the mechanical operating means 18.

To control movement of the brake in each direction, there are provided two series (upper and lower) of anchor links at each side of the brake. At the lower side of the brake (as shown in Fig. 1), these comprise links 60, 61 which are pivoted at their outer ends to bosses 22, 23 on brake shoes 15, 15', respectively, and at their inner ends terminate in forked ends 63, 64 to slidingly engage a pin 65 on the spider 20.

At the upper side of the brake (as shown in Fig. 1), there are corresponding anchor links 60', 61' which are pivoted at their outer ends to the bosses 22', 23' on brake shoes 15, 15', respectively, and at their inner ends terminate in forked ends 63', 64' to slidingly engage a pin 65' on the spider 20.

When it is desired to apply the brake 11, with the construction shown in Figs. 1 and 5, the operator pushes the pedal 36 which, through suitable linkage 37', actuates the auxiliary fluid cylinder 54 and, through tubing 55, transmits this motion to piston 50 to apply the brake through the hydraulic operating means 19. This actuates connecting rod 41', rocks levers 31, 31' on their pivots, and moves links 27, 27', and hence toggles 16, 16', outwardly to expand the shoes 15, 15'.

If the device is rotating in a clockwise direction, so that the brake shoes are turning in the direction shown by the arrow in Fig. 1, this will cause anchor links 61' of shoe 15' to seat against pins 65', and cause anchor links 60' of shoe 15 to pull away from pins 65'. This starts the application of the brake in the vicinity of boss 22'. It also causes anchor links 60 of shoe 15 to seat against pins 65 and anchor links 61 of shoe 15' to pull away from pins 65. This simultaneously starts the braking action of shoe 15' in the vicinity of boss 23.

As the shoes 15, 15' are forced outwardly, this forces the lining 14 into contact with the drum 12 and produces a smooth, uniform braking action.

If for any reason the hydraulic operating means 19 does not function satisfactorily as, for instance, on account of a break in tubing 55, the further depression of brake pedal 36 will cause a pin 56 in a slotted link 57 to actuate connecting rod 37 and apply the brake through the mechanical operating means 18. This will actuate brake pull rod 35 and levers 30 and 30', through connecting rod 41, and the toggles 16, 16' through links 27, 27' respectively. The action of the anchor links and the initial application of the brake shoes will be as described above.

If desired, the brake may be made with either the hydraulic operating means 19 or the mechanical operating means 18 without the other operating means. The former construction is illustrated in Fig. 7, as described below.

Where only the mechanical operating means 18 is used, the hydraulic operating means 19 and its connecting parts shown in Fig. 1 may be omitted. To actuate the mechanical operating means the operator would push pedal 36 which, through linkage 37, causes the movement of the pull rod 35 and the actuation of the levers 30, 30' through the links 27, 27'. This movement is transmitted to the toggles 16, 16' which force the shoes 15, 15' outwardly, as explained above.

In any of these methods of operation, as the power which is transmitted as the result of the operation of the pedal 36 is released, the spring action in the shoes 15, 15', along with the retracting action of the toggle mechanisms 16, 16', supplemented by springs 17, 17' connected between the free ends of the shoes, completely releases the shoes from the brake lining 14 and drum 12, and causes anchor links 60', 61 to seat against anchor pins 65', 65, respectively, thus releasing all binding pressure on the brake lining.

When the vehicle is moving in the opposite direction, so that the brake shoes are turning in the opposite direction from that of the arrow in Fig. 1, the movement and application of the brake shoes takes place in just the reverse direction from that described above. In other words, the anchor links 61' of shoe 15' will pull away from pins 65' and the anchor links 60' of shoe 15 will seat against pins 65'. Similarly, anchor links 60 of shoe 15 will pull away from anchor pins 65 and anchor links 61 of shoe 15' will seat against pins 65, and the braking action of shoe 15 will begin in the vicinity of boss 22, and that of shoe 15' will begin in the vicinity of boss 23'.

To guide the relation of the brake shoes 15, 15' to the spider 20 I prefer to provide light springs 70, 70' which exert a light pressure between the spider and bosses 71, 71' on the shoes 15, 15', respectively.

As shown in Fig. 7, the brake may be actuated solely by a hydraulic operating means 19 which corresponds to the hydraulic operating means 19 in Fig. 1. In this construction the operation is exactly the same as that described above for Fig. 1, except that, for convenience, the hydraulic operating means is mounted at the right of the figure instead of at the left as shown in Fig. 1.

In the embodiments of my invention shown herein I have disclosed the use of a spider 20. This comprises a continuous plate 72 and two smaller auxiliary plates 73, which are secured together in any desired manner, as by pins 74 which are spot welded or riveted to the plates 72 and 73. It will be obvious, however, that where desired the smaller plates 73 may be replaced by a second plate 72, or that the spider may assume any other suitable form.

The embodiments of my invention disclosed herein may be made of any suitable materials, although I prefer to have my brake shoes 15, 15' flexible throughout their entire length and I therefore make them of uniform cross section, except for the bosses 22, 23, 22', 23', 71, 71'. The spider 20 is preferably made of steel stampings 72 and 73. The various pins 26, 26', 28, 28', 34, 40, 40', 53, 53', 65 and 65' may be of any suitable type, but are preferably perforated at one or both ends to receive cotter pins 75, or are retained in place in any other desired way, as by riveting.

As shown in Figs. 1 and 7, the connecting rods 41 and 41' are preferably provided with turnbuckles 76, 76', respectively, to make them adjustable for varying the pressure exerted by the toggles.

It is a special point of my invention to provide self-centering brake shoes 15, 15' which are only secured to the spider 20 through the toggles 16, 16' and the light springs 70, 70'. The latter may be omitted if desired. This method of mounting the brake shoes allows them to have an independent self-centering action, since they are both free to find their own center and seat throughout their length. They are therefore able to correct any slight off-center relation between the brake drum and the axle and prevent the characteristic ridging of the interior of the brake drum which is the usual, if not universal, accompaniment of the use of a fixed brake shoe.

It is also a special feature of my invention to provide a brake with a creeping brake lining 14, of any desired type, which is free to creep or float in the space between the brake shoes 15, 15' and the drum 12 during the periods between applications of the brake, and while the brake is being applied or released. By providing a creeping brake lining, I avoid the overheating and the tendency to secure braking with the same zone of the brake lining at all times, which are inherent in a brake having a fixed brake lining.

Since the brake shoes 15, 15' are in reality floating members, and the brake lining is not secured to them, the characteristic clinging action of previous brakes is avoided and a quick, positive release of the brake is secured when the brake pedal is released. This eliminates the pronounced chattering of previous brakes when they are applied lightly, and the grabbing when they are applied quickly or savagely, and produces a smooth, velvety braking action.

It will also be apparent that, by means of my self-centering brake shoes 15, 15' I am able to correct the almost inevitable eccentricity of the mounting of the brake shoes with respect to the brake drum and to secure a quick release of the brake, and that, by virtue of the creeping brake lining, I not only eliminate the difficulty of originally installing as well as of replacing brake linings, but the wear resulting from the application of the brakes is distributed over the entire area of the brake lining instead of being limited to certain portions thereof, and that this also accomplishes the highly valuable adjunct of eliminating overheating.

As a result of the use of the floating connection between the brake shoes and the spider, I eliminate binding between the shoes and the drum, because the first braking action, as the shoes are expanded, shifts the pivotal connection between the forward anchor link and its shoe in the direction the brake shoes 15, 15' are forced and pulls the rear anchor link away from its pin. The floating connection also aids in taking care of wear on the brake lining, as well as any eccentricities in the mounting of the brake shoes with respect to the brake drum.

It will be apparent from the above description that the constructions shown virtually give two independent brakes in either direction on each wheel of the vehicle, and that the action of these brakes is controlled through the anchor links 60, 61, 60', 61'.

As many apparently widely different embodiments of this invention may be made without departing from the spirit thereof, it is to be understood that I do not limit myself to the foregoing embodiments or description except as indicated in the following claims.

I claim:

1. In a brake, the combination of a drum, a brake lining, a spider, a pair of independently self-centering brake shoes, means for anchoring both ends of each brake shoe to the spider without restricting the independent self-centering action of the brake shoes, means for applying braking pressure to one end of one brake shoe, and means separate from said first mentioned means, but actuated thereby, for simultaneously applying similar pressure to the opposite end of the other brake shoe, comprising a pair of connecting rods each of which is attached at each end to a lever pivoted to the spider, the free end of each lever being attached to a link which actuates a toggle to expand the brake shoes.

2. In a brake, the combination of a drum, a brake lining, a spider wholly within the drum, a pair of independently self-centering brake shoes, a single anchor pin carried by the spider at each side of the brake in proximity to the meeting ends of the brake shoes, links carried by the adjacent ends of the brake shoes for selective abutment against said single pin at each side of the brake, means for preventing the disengagement of said links with said pins, and means for simultaneously applying braking pressure to one end of each shoe to thereby start the application of the brake at that end of each shoe and to cause the link at the opposite end of each shoe to abut the corresponding anchor pin.

3. In a brake, the combination of a drum, a brake lining, a spider wholly within the drum, a pair of independently self-centering brake shoes, a single anchor pin at each side of the brake, links carried by the adjacent ends of the brake shoes for sliding contact with said adjacent pin, and means for applying braking pressure simultaneously to each end of each brake shoe, said means comprising a linkage at each side of the brake for transmitting the brake applying impulse it receives to the ends of the brake shoes, means for transmitting the brake applying impulse to one portion of said linkage, and means separate from said last mentioned means arranged on opposite sides of said brake for simultaneously transmitting any movement of said first mentioned portion of the linkage to all of the other portions of said linkage.

4. In a brake, the combination of a drum, a brake lining, a spider wholly within the drum, a pair of independently self-centering brake shoes, and means for simultaneously applying the brake shoes, comprising an actuating means, symmetrically arranged connecting rods at each side of the brake, one of said connecting rods being connected so that it directly receives said actuating impulse, the other of said connecting rods being so connected that it indirectly receives said actuating impulse, and a pair of toggles for simultaneously receiving said actuating impulse from said connecting rods and applying braking pressure at each end of each brake shoe.

5. In a brake, the combination of a drum, a brake lining, a spider wholly within the drum, a pair of independently self-centering brake shoes, and means for applying braking pressure to each end of each brake shoe, comprising a pair of toggles for applying braking pressure at each end of each brake shoe, optional brake actuating means arranged on opposite sides of said brake, and means connecting each of said optional brake actuating means with both of said toggle mechanisms.

6. In a brake, the combination of a drum, a brake lining, a spider wholly confined within the outline of the brake shoes, a pair of independently self-centering brake shoes, means for anchoring both ends of each brake shoe to the spider without restricting the independent self-centering action of the brake shoes, two sets of toggles for applying the brake shoes, an actuating lever for each set of toggles, means for transmitting braking pressure to one of said actuating levers, and a pair of connecting rods, each of which has one end connected to each of the toggles, for simultaneously transmitting similar pressure to both ends of both brake shoes.

JESSE G. HAWLEY.